United States Patent
Brown

[11] 4,052,851
[45] Oct. 11, 1977

[54] HYDRAULIC BRAKE BOOSTER HAVING INDEPENDENT RESERVE SYSTEMS

[75] Inventor: Arthur K. Brown, South Bend, Ind.

[73] Assignee: The Bendix Corporation, South Bend, Ind.

[21] Appl. No.: 729,556

[22] Filed: Oct. 4, 1976

[51] Int. Cl.² .......................... F15B 1/02; F15B 20/00
[52] U.S. Cl. ..................................... 60/404; 60/416; 60/582
[58] Field of Search ................. 60/404, 405, 416, 582

[56] References Cited
U.S. PATENT DOCUMENTS

| | | | |
|---|---|---|---|
| 2,396,984 | 3/1946 | Broadston et al. | 60/404 |
| 3,719,044 | 3/1973 | Bach | 60/404 |

Primary Examiner—Edgar W. Geoghegan
Attorney, Agent, or Firm—Paul David Schoenle; Ken C. Decker

[57] ABSTRACT

A hydraulic brake booster provides two independent accumulators for assisting a brake application when insufficient pressure is communicated to the hydraulic brake booster for braking. The first accumulator is connected to the hydraulic brake booster housing, and the second accumulator is remotely disposed to the housing with a conduit forming a connection therebetween. A spool valve, slidably mounted in the housing, is engageable with a pair of check valves to communicate the first and second accumulators with a pressure chamber within the housing. A pair of bores within the housing receive the check valves and a unitary relief and charging valve is slidably carried in each bore for communicating an inlet port with each accumulator.

9 Claims, 2 Drawing Figures

HYDRAULIC BRAKE BOOSTER HAVING INDEPENDENT RESERVE SYSTEMS

BACKGROUND OF THE INVENTION

This invention relates to a hydraulic brake booster. Such boosters generally use pressurized fluid developed by a vehicle's power steering pump to provide a power assist to the vehicle master cylinder when the brakes of the vehicle are applied. If the power steering pump ceases to operate, a hydraulic reserve system is provided to supply pressurized fluid to the booster.

It is well known in the art to provide an accumulator which is charged during normal operation of the power steering pump for supplying pressurized fluid to the booster.

The weight of a motor vehicle generally determines the size or capacity of the brake booster, which must provide sufficient power assistance during braking. Correspondingly, the capacity of the hydraulic reserve system or accumulator is also dependent on the weight of the motor vehicle, for the accumulator must also provide a sufficient power assist to effectuate braking.

With one size of brake booster housing it is possible to vary the power assistance by varying the diameter of a piston, which is slidably disposed within the brake booster housing. Therefore, with one size of brake booster housing it is desirable to provide a hydraulic reserve system, which system is suitable for various sizes of pistons to provide the necessary power assistance when the steering pump ceases to operate, regardless of the power assistance required by the weight of the motor vehicle.

SUMMARY OF THE INVENTION

The present invention provides a hydraulic reserve system for a hydraulic brake booster, which system comprises two independent accumulators communicable with the hydraulic brake booster.

In particular, a first accumulator is connected to the booster housing and a second accumulator is remotely disposed to the booster housing and in communication therewith via a flexible conduit. Each accumulator communicates with a pressure chamber within the housing through independent passages that communicate with bores which extend between the pressure chamber and an inlet port. Each passage intersects a respective bore between a unitary charging and relief valve and a check valve.

Each accumulator is charged through the charging and relief valve and vented therethrough when the pressure within each accumulator is above a predetermined value. A spool valve slidably mounted in the booster housing is engageable with each check valve, when insufficient fluid pressure is communicated to the pressure chamber during braking, to communicate the pressure chamber with the first and second accumulator. As each accumulator is independent of the other, the failure of one accumulator does not affect the power assistance provided by the other accumulator.

DETAILED DESCRIPTION

Figure 1:
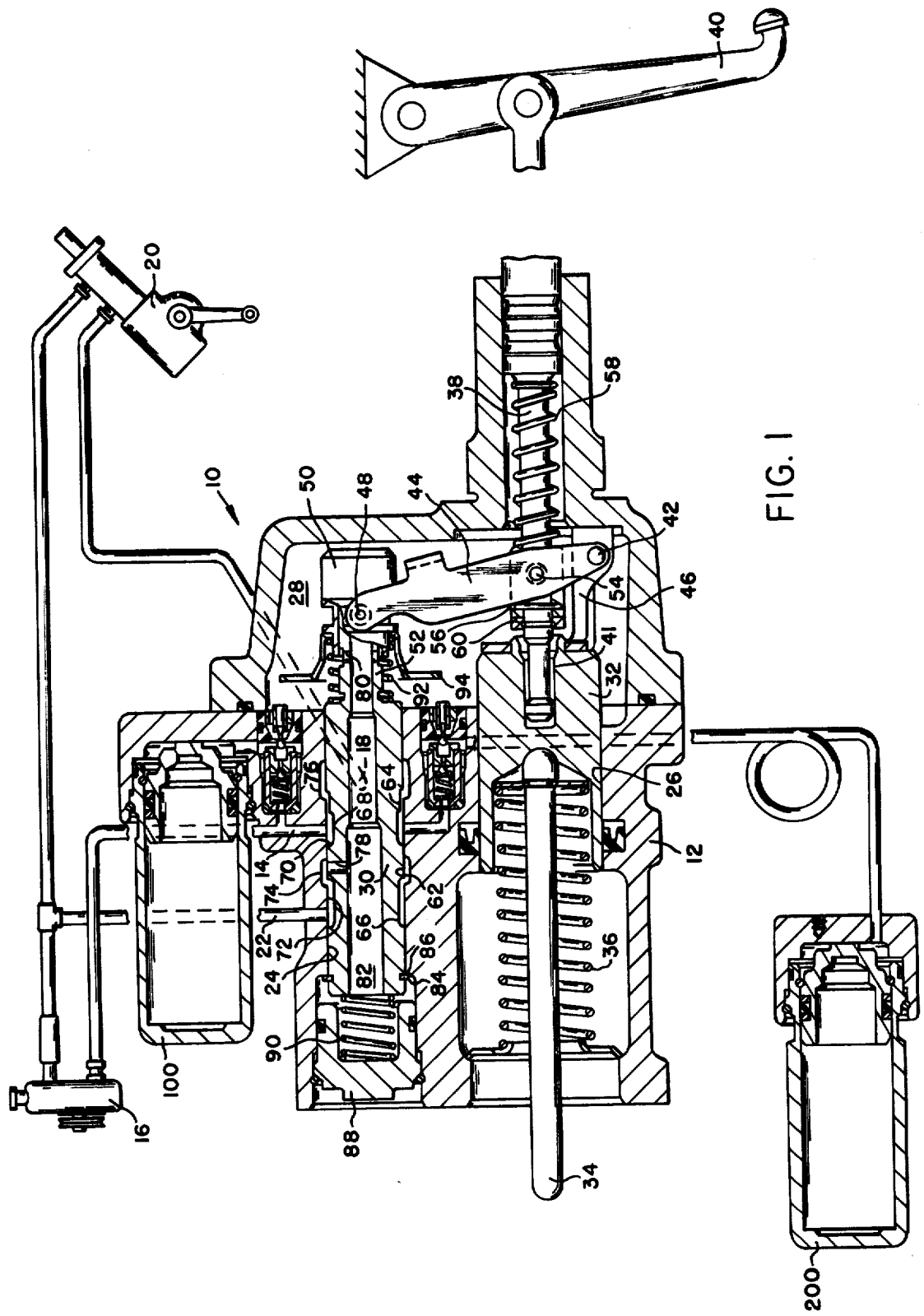
FIG. 1 is a schematic view of a vehicle hydraulic system with a brake booster and hydraulic reserve system made pursuant to the present invention illustrated in cross-section.

Referring now to the drawings, the brake booster 10 includes a housing 12 and an inlet 14 communicated to the outlet or high pressure side of the vehicle's power steering pump 16, and outlet port 18 which is communicated to the inlet of the vehicle's power steering gear 20, and a return or exhaust port 22. The outlet of the power steering gear 20 and the return port 22 are each communicated to a reservoir (not shown) and the inlet of the power steering pump 16.

The housing 12 defines a first bore 24, a second bore 26, and a pressure chamber 28 therewithin. A spool valve 30 is slidably mounted in the bore 24 and is adapted to control communications between the ports 14, 18 and 22 as will be more fully described hereinafter. A piston 32 is slidably mounted in the bore 26 and projects into the pressure chamber 28. A rod 34 connects the piston 32 with a standard automotive master cylinder (not shown) mounted to the left of the housing 12. A spring 36 yieldably urges the piston 32 to the right viewing FIG. 1, toward the brake-release position. One end of a control rod 38 is connected to a brake pedal 40 which is mounted in the operator's compartment of the vehicle, and the other end of the rod 38 is slidably received in a blind bore 41 provided in the piston 32. A first pivot 42 connects one end of a lever 44 to a bracket 46 carried by the piston 32. A second pivot 48 connects the other end of the lever 44 to a cap member 50 which is slidably mounted on the reduced diameter portion 52 of the spool valve 30 which extends into the pressure chamber 28. A third pivot 54 connects the lever 44 to a bracket 56 which slides on the rod 38. A spring 58 yieldably urges the bracket 56 into engagement with a retainer 60 fixed to the rod 38.

Spool valve 30 includes lands 62, 64 and grooves 66, 68 which cooperate with lands 70, 72 and grooves 74, 76 on the wall of the bore 24 to control fluid communication into and out of the pressure chamber 28. The inlet port 14 communicates with groove 68, the outlet port 18 communicates with the groove 76, and the return port 22 communicates with the groove 66. Radially extending passages 78, 80 and an axially extending passage 82 within the spool valve 30 communicate the groove 74 with the pressure chamber 28. The spool valve 30 is shiftable from a first position defined by the engagement of a stop ring 84 with a shoulder 86 on the bore 24 to a second position defined by the engagement of the end of the spool valve 30 with a plug 88 closing the end of the bore 24. A spring 90 yieldably urges the spool valve 30 toward the first position. Another spring 92 yieldably urges the cap member 50 to the right viewing FIG. 1, thereby permitting fluid communication through the radial passage 80 into the pressure chamber 28. The spring 92 also retains an annular member 94 for movement with the cap member 50, the function of which will be described hereinafter.

Figure 2:
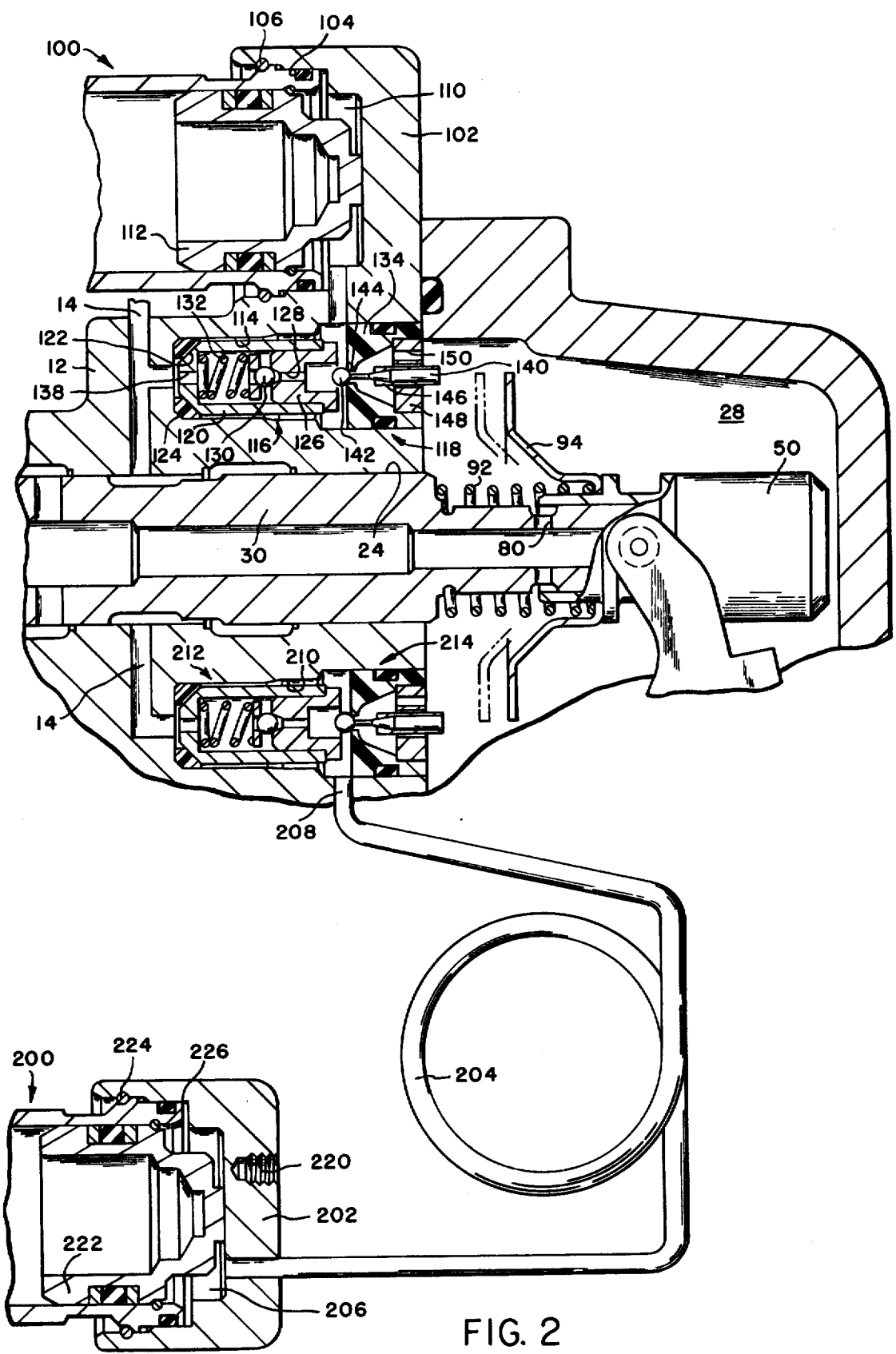
FIG. 2 is an enlarged, detailed view of a portion of FIG. 1.

Turning to FIG. 2, a first accumulator 100 is connected to the housing 12. A radially extending flange 102 on the housing includes a blind bore 104 for receiving the accumulator 100 and a snap ring 106 cooperates with a recess on the bore and a shoulder on the accumulator to connect the accumulator to the housing flange 102.

Extending from the flange bore 104, a first passage 108 communicates the accumulator chamber 110, formed between the slidable piston 112 and the flange 102, with a housing stepped bore 114. The housing bore 114 extends from the inlet port 14 to the pressure chamber 28 and carries a unitary charging and relief valve, generally indicated as 116. A check valve, generally indicated at 118, retains the charging and relief valve 116 within the bore 114, and the valve 116 is free to reciprocate in the bore 114.

The charging and relief valve 116 comprises a cylinder member 120 with a frusto conical leading edge 122, that sealingly engages an elastomeric ring 124 to close fluid communication between the bore 114 and the cylinder member 120. A plug 126 is permanently secured to an open end of the cylinder member 120 and is provided with a relief passage 128. A relief ball valve 130 is biased towards the relief passage 128 by a spring 132 to close the relief passage 128.

The check valve 118 includes an insert 134 that is retained within the bore 114 by the portion 136 of the housing that overlaps the bore 114. A stem 140 includes a ball valve 142 for closing an insert opening 144 when the pressure on the left of insert 134, viewing FIG. 2, is greater than in the pressure chamber 28. An enlarged portion on the stem 140 at 146 forms a valve for closing the opening 144 when the pressure in the pressure chamber is greater than on the left of the insert 134. The stem 140 is slidably carried in the insert 134 by a plug 148 that includes apertures 150 for providing communication between the pressure chamber 28 and the insert opening 144, which opening 144 communicates via bore 114 with the first passage 108.

A second accumulator 200 is connected to a cap or support means 202, and a flexible conduit 204 connects the second accumulator chamber 206 with the booster housing 12. The conduit 204 communicates with a second passage 208, which passage 208 intersects a stepped housing bore 210 extending from the inlet port 14 to the pressure chamber 28. As the charging and relief valve, generally indicated as 212, within housing stepped bore 210 is similar to the valve 116 within housing bore 114, the description of valve 116 is applicable to the charging and relief valve 212 within bore 210. Likewise, the check valve 214 within bore 210 is similar to the check valve 118 within the bore 114 so that the description of check valve 118 is applicable to check valve 214. However, the check valve 214 is press fitted within bore 210 to secure the check valve 214 thereto rather than abutting a portion of the housing, as the check valve 118 does.

The second accumulator 200 is remotely disposed to the booster housing 12 and includes mounting means 220 for securing the second accumulator to a support other than the booster housing 12, such as a firewall within an engine compartment on the motor vehicle. A slidable piston 222 within accumulator 200 cooperates with the cap 202 to form the second accumulator chamber 206, and the accumulator 200 is secured to the cap 202 by means of a snap ring 224 which is received in a recess on a bore 226 on the cap 202.

In accordance with the invention, the check valves 118 and 214 are disposed substantially 180° apart on opposite sides of the housing bore 24 and are engageable with the annular member 94 on the spool valve 30. As illustrated, the annular member 94 is engageable simultaneously with both check valves 118 and 214 via the stems 140; however, the annular member 94 could engage the check valves sequentially with different size stems 140 in order to communicate one of the accumulators, 100 or 200, initially with the pressure chamber 28. Moreover, each passage 108 and 208 is independent of the other so that fluid stored within each accumulator and communicated to the pressure chamber 28 does not combine with the other accumulator stored fluid.

MODE OF OPERATION

The spool valve 30 cooperates with the housing in a manner that is well known in the prior art to communicate the inlet port 14 with the pressure chamber 28. Increasing pressures in the pressure chamber 28 urge the piston 32 to the left, viewing the Figures, to develop braking pressure in the master cylinder (not shown). If the pressure that is communicated to the pressure chamber 28 is insufficient to urge the piston 32 against the spring 36, the lever 44 is rotated about pivot 42 by the movement of rod 38 to slide the cap 50 on the spool valve 30 against spring 92. The cap 50 moves to the left, viewing FIG. 2, to close passage 80. Further movement of the cap 50 moves the annular member 94 to the left, until the radial outer edge of the member 94 engages the stems 140 of check valves 118 and 214. The annular member cooperates with the check valves to open communication between the pressure chamber 28 and each accumulator chamber 110 and 206, thereby communicating stored pressurized fluid from independent sources, specifically accumulators 100 and 200, to the pressure chamber 28 to urge the piston 32 to the left to develop braking pressure in the master cylinder.

The accumulators 100 and 200 are charged with pressurized fluid during normal braking operation. For example, when the power steering pump is activated, pressurized fluid is communicated throughout the inlet port 14. The cylinder member 120 is responsive to the pressurized fluid in the inlet port to move to the right to open communication between the inlet port 14 and the first passage 108 via the clearance between the cylinder member 120 and the bore 114. The pressurized fluid in passage 108 is communicated to accumulator chamber 110, thereby urging the piston 112 to the left to compress the chamber on the left side of piston 112 which reacts to compress the stored fluid in accumulator chamber 110.

Because the charging and relief valve 212 is also exposed to the inlet port 14, the accumulator 200 is charged in the same manner as the accumulator 100.

If the pressurized fluid stored in accumulator 100 (or accumulator 200) reaches a pressure above that required for the hydraulic brake booster, the relief ball valve 130 in charging and relief valve 116 is exposed to the pressure in the accumulator via passage 108 and bore 114 and is responsive thereto to move ball valve 130 against spring 132 away from the plug opening 128 to vent the accumulator 100 to the inlet port 14 via opening 138 in the cylinder member 120.

In view of the foregoing description, it is apparent that the preferred embodiment of the present invention provides an additional accumulator 200 that is independent of the existing accumulator 100. The independent accumulator 200 is activated simultaneously with the existing accumulator 100, because the check valve 214 is disposed in the housing bore 210 at the same axial position as the check valve 118 so that the annular member 94 on spool valve 30 is engageable with both check valves 118 and 214. Moreover, each accumulator is simultaneously charged via respective valves 116 and 212 with pressurized fluid from inlet port 14 and relieved of excessive pressures through a respective ball relief valve within valves 116 and 212.

I claim:

1. A hydraulic brake booster comprising:
   a housing defining a pressure chamber;
   a spool valve slidably mounted within the housing;
   said spool valve being movable to open and close communication to the pressure chamber;
   a piston forming a portion of the pressure chamber and being responsive to the pressure within the pressure chamber to more relative to the housing for actuating braking;
   a first accumulator connected to the housing and communicating with the pressure chamber when the pressure in the pressure chamber is below that required to move the piston; and
   a second accumulator communicating with the pressure chamber when the pressure in the pressure chamber is below that required to move the piston.

2. The hydraulic brake booster of claim 1 in which said second accumulator is remotely disposed to said housing and conduit means communicates the second accumulator to the pressure chamber.

3. The hydraulic brake booster of claim 1 in which operator actuating means cooperate with the spool valve to move the spool valve in the housing, said housing carrying check valves, each of which cooperate with one of said first and second accumulators, respectively, to close communication between the pressure chamber and the accumulators, and said spool valve being engageable with the check valves to open communication between the first accumulator and the pressure chamber and between the second accumulator and the pressure chamber.

4. The hydraulic brake booster of claim 3 in which said spool valve is sequentially engageable with the check valves.

5. The hydraulic brake booster of claim 3 in which each of said check valves in a first position closes communication between a respective accumulator and the pressure chamber when the pressure in the respective accumulator is greater than the pressure in the pressure chamber and each of said check valves is movable to a second position in response to a pressure differential across each of said check valves to also close communication between the respective accumulator and the pressure chamber when the pressure in the respective accumulator is less than the pressure in the pressure chamber.

6. The hydraulic brake booster of claim 3 in which said housing forms an inlet port for communicating a pressure source with the spool valve, said housing forming a pair of bores, each of said bores communicating with the inlet port, a respective accumulator and the pressure chamber, said check valves being disposed, one in each of said bores and a charging and relief valve in each of said bores between the inlet port and the check valves.

7. The hydraulic brake booster of claim 6 in which said housing defines separate passages, each of which communicates a respective accumulator with one of said bores and said separate passages intersect said bores between the check valves and the charging and relief valves.

8. The hyraulic brake booster of claim 6 in which each of said charging and relief valves is a unitary assembly which is slidably carried within a respective bore in said housing.

9. A hydraulic brake booster comprising:
   a housing having an inlet port and defining a pressure chamber;
   a valve movable within said housing to open and close communication between the inlet port and the pressure chamber;
   a piston responsive to the pressure within the pressure chamber to move relative to the housing for actuating braking; and
   a plurality of accumulators communicable with the inlet port to store pressurized fluid from the inlet port in each of said accumulators, said plurality of accumulators being communicable with the pressure chamber through separate independent passages and each separate independent passage carries a check valve whereby said valve is movable within the housing to cooperate with each check valve to open communication between the pressure chamber and said plurality of accumulators.

* * * * *